Aug. 13, 1968        R. B. STROUT ET AL        3,396,752
                 INTERNALLY EXPANSIBLE TRAP
Filed April 18, 1966                        2 Sheets-Sheet 1

Aug. 13, 1968  R. B. STROUT ET AL  3,396,752
INTERNALLY EXPANSIBLE TRAP

Filed April 18, 1966  2 Sheets-Sheet 2

United States Patent Office 3,396,752
Patented Aug. 13, 1968

3,396,752
INTERNALLY EXPANSIBLE TRAP
Russell Brown Strout and John William Harrison, Winchester, Mass., assignors to Lowry Development Corporation, Winchester, Mass., a corporation of Massachusetts
Filed Apr. 18, 1966, Ser. No. 543,286
5 Claims. (Cl. 138—27)

ABSTRACT OF THE DISCLOSURE

A waste trap unit for basins and toilet bowls providing protection against freeze damage while not interfering with the operation of the trap as a seal against reverse gas flow has a top aperture through which is inserted a composite block of elastically compressible material internally reinforced with a rigid reinforcement that can be rigidly replaceably fastened in the unit so that the trap is expansible in volume in every cross section taken below the normal level of water transversely to the direction of liquid flow therethrough.

---

This invention relates to waste traps for water drains such as are attached to basins and toilet bowls and is concerned particularly with a waste trap unit which provides bulit-in protection against freeze damage without interfering with the operation of the trap as a seal against reverse gas flow.

The increasing popularity of winter sports has led to greatly increased use of summer cottages, skiing lodges and other private accommodations on a part-time basis, such as for weekends only. Because of the freezing climate prevailing in winter sports areas, such accommodations cannot be safely left vacant and unheated without taking precautions to prevent freezing damage to plumbing installations. Normally this involves draining all tanks and pipes plus either pumping out or adding anti-freeze solutions to all traps. If the traps are pumped out they no longer serve the purpose of preventing reverse flow of gases into the building. Addition of anti-freeze solutions becomes costly when it has to be done several times during a winter, and is not always secure because of the volatility of most of the low temperature freezing liquids, particularly alcohol. Further, such solutions are not desirable additions in quantity to septic tanks.

A main object of this invention is to provide a waste water trap which need not be pumped out nor have anti-freeze solution added thereto and needs absolutely no attention when leaving an unheated cottage since it has built-in protection against freeze damage while still maintaining a gas seal whether frozen or not.

To accomplish this objective a trap is provided which has a rigid inlet and a rigid outlet at such related levels as to provide, in an intervening conduit extending below the level of the outlet, a water trap. The intervening conduit has walls formed at least in part of a compressible material providing a continuous compressible surface extending preferably substantially all the way from the termination of the rigid inlet pipe to the beginning of the rigid outlet pipe thus providing a water trap which is expansible in cross-sectional internal volume at substantially every cross-section taken below the normal level of water in the trap and transversely to the flow of liquid therethrough.

In addition, the trap is optionally provided at the bottom with an electrical heating unit which can be turned on to thaw the trap or which can be maintained at a minimum temperature heating level by a thermostat to prevent freezing, the expansible nature of the drain providing a safety factor against loss of power.

Figure 1:
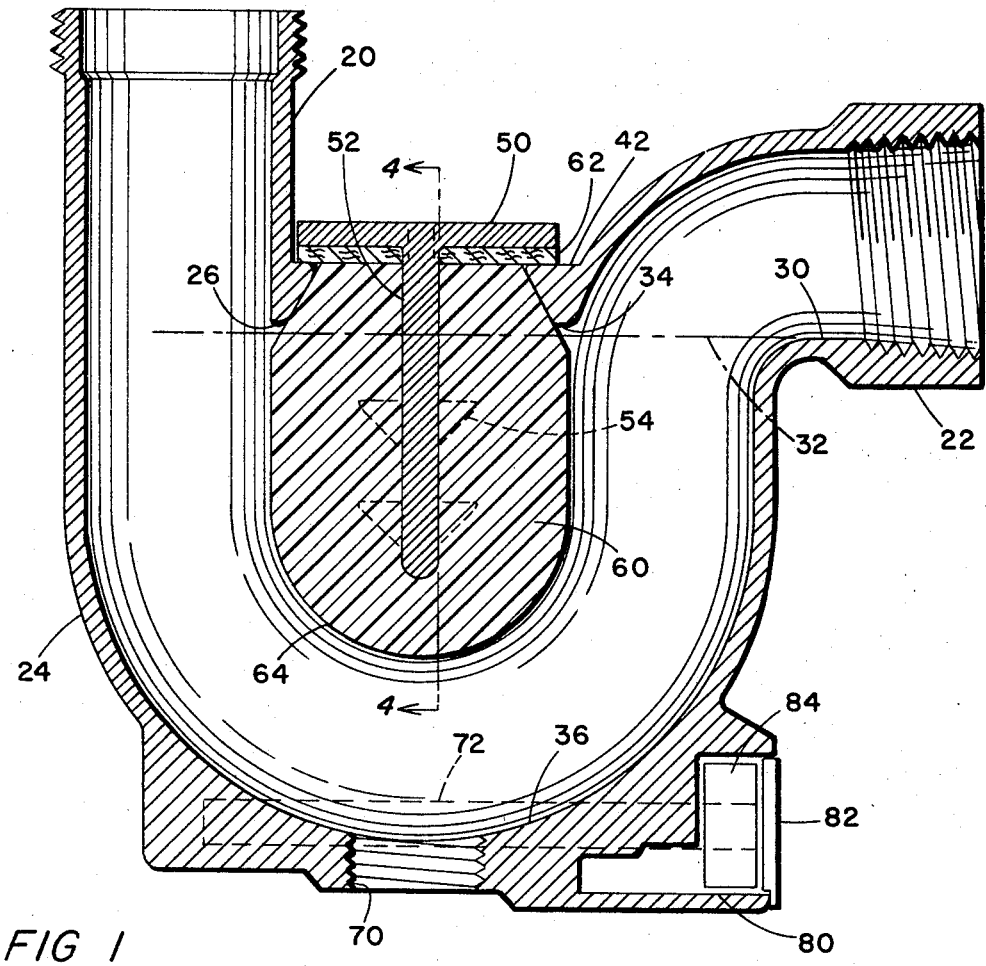
Figure 2:
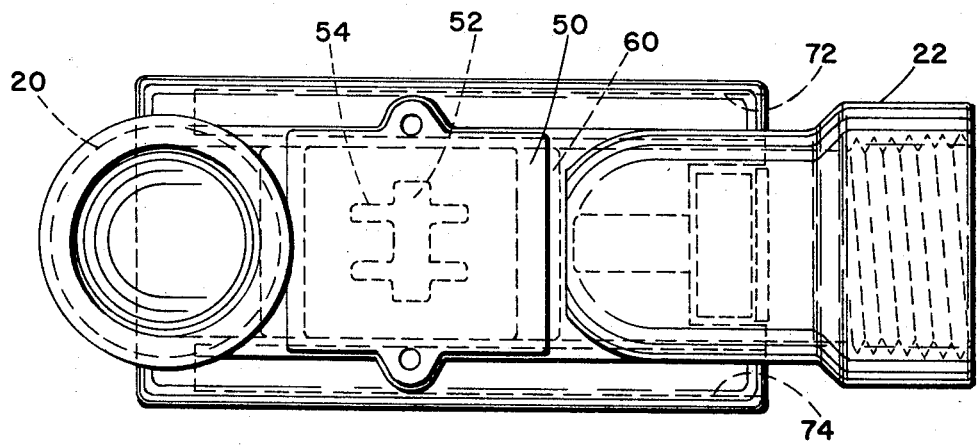
Figure 3:
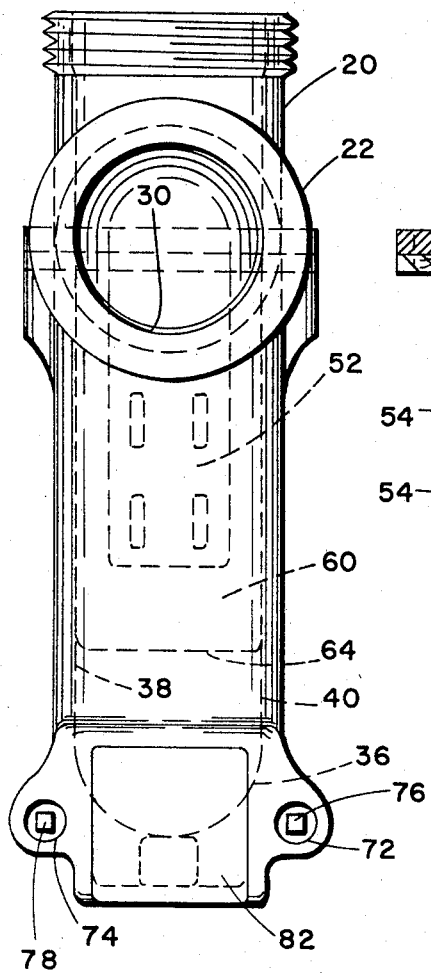
Figures 4, 5:
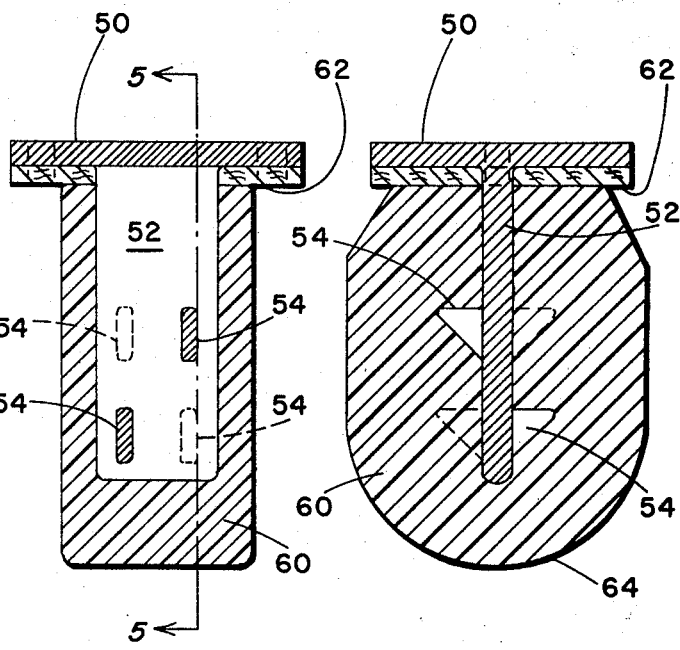

A typical embodiment of the invention is shown in the accompanying drawings wherein FIG. 1 is a cross-sectional view of the trap;
FIG. 2 is a plan view thereof;
FIG. 3 is a side elevational view thereof;
FIG. 4 is a cross-sectional view taken along the broken line 4—4 of FIG. 1; and
FIG. 5 is a cross-sectional view taken along the broken line 5—5 of FIG. 4.

As shown in FIG. 1, the unit includes an externally screw-threaded rigid vertical inlet pipe 20 at the left and a rigid internally screw-threaded generally horizontal outlet pipe 22 at the right.

For the purposes of this application, the inlet pipe 20 is considered as terminating at the point of its discharge into an underlying metal casing 24 at a level determined by a bottom end edge 26 (FIG. 1). It will be noted that this edge 26 is slightly above the highest bottom interior level at 30 of outlet pipe 22 so that when excess water is discharged through the unit and then cut off, water will be trapped in the unit up to the level indicated by the broken line 32 (FIG. 1) extending just slightly below the bottom edge 26 of the inlet pipe.

The corresponding inside bottom edge 34 of the outlet pipe 22 also does not extend down to the normal water level line 32.

The casing 24 has a cavity defined by an internal bottom arcuate rigid wall 36 and two parallel vertical spaced rigid walls 38 and 40, the latter of which meet a top rigid wall 42 provided with a central rectangular aperture, the end edges of which are integral with inlet pipe 20 and outlet pipe 22 respectively.

Suspended through the aperture is an insert which includes a rigid rectangular cap 50 having a depending rigid reinforcement in the form of a plate 52 provided with oppositely facing staggered projecting spurs 54. Molded or otherwise placed around the reinforcement is a block of elastically compressible material 60, for example, closed cell synthetic rubber-type foam sealed to the cap 50 by an intervening gasket 62 which may be an integral part of the block 60 or may be a separate piece cemented to the block 60. Plastic polyethylene foam has been found to be an eminently suitable material for block 60. The block may have a continuous skin surface such as is formed by a mold.

The block 60 has an uncompressed width between its parallel side surfaces slightly greater than the distance between the vertical casing walls 38 and 40 to make a tight fit therebetween and is contoured in a length-wise direction as shown in FIG. 5, extending outwardly to a length somewhat greater than the length of the cap 50 but being insertable through the aperture by reason of its compressibility.

The bottom surface of the block 60 forms a wall 64 which is arcuate lengthwise to conform with the lengthwise arcuate contour of the bottom casing wall 36, although, unlike transversely arcuate wall 36, wall 64 is transversely straight, as shown in FIG. 3.

The reinforcing plate 52 gives a rigidity to the insert to prevent it from bending bodily to narrow or plug the conduit of substantially uniform section which it forms with casing cavity wall 36, 38, 40. Also, the plate acts at its ends to localize the compression pressure on the foam assuring a good gas seal along side walls 38 and 40 above the water level in the trap.

With the insert rigidly fastened with respect to inlet and outlet pipes 20 and 22 and the bottom casing 24, it will be seen that the conduit will be expansible in volume, by reason of the compressibility of the block 60, in every cross-section located below the normal water level line 32 as shown in FIG. 1, taken transversely to the direction of liquid flow through the conduit.

The water (or ice) provides a gas seal up to the water line level and, above the water level, the block 60 completes the seal against reverse gas flow.

As shown in the drawings, the wall 64 provides a conduit wall portion which is elastically compressible all the way from edge 26 to the edge 34 for the purpose of providing a maximum area of compressibility in wall 64 to absorb ice expansion. However, sufficient area of compressibility to prevent freeze damage may be provided without having this entire surface 64 compressible. For example, if compressibility is present continuously between levels not very far below the normal level of water at the inlet and outlet ends of the trap, that may suffice, since expansion forces exerted near the water level during ice formation may be relieved by upward expansion into the inlet and outlet pipes. For these reasons, where, in the accompanying claims, reference is made to a wall of the conduit being elastically compressible throughout "substantially" its entire length, the intention is to include a sufficient area of compressibility in that wall below the normal water level to prevent freeze damage, it being anticipated by calculation that the compressible area should be at least 70% of the area of the wall 64 below the water level depending upon the internal diameter of the conduit. Even then, if as much as 30% of the area of wall 64 below the normal water level is not compressible, this rigid area probably should not be concentrated together if a sufficient safety factor against freeze damage is to be included.

Of course, the less the area of the conduit internal surface that is compressible, the less likely there may be damage to the conduit during cleaning of the trap with brushes or the like. It is for this reason that the compressibility in the conduit is provided only in the wall opposite the bottom wall of the conduit, since the main abrading action of inserted cleaning brushes, etc. will occur against the bottom and side rigid walls which can better withstand such abrasive cleaning than the plastic wall 64.

The bottom of casing 24, as shown is provided with a screw-threaded drain outlet 70 (normally plugged) and with three cavities. Two of the cavities are in the form of parallel bores 72 and 74 for the reception, respectively, of an electrical resistant element heater 76 and a thermo-sensitive unit 78 (shown only in FIG. 3). The third cavity 80 with a cover 82 may enclose a thermostat 84, (shown only in FIG. 1) suitably wired to the thermo-sensitive element and heater to maintain the casing 24 at a minimum temperature above freezing.

What is claimed is:

1. A waste trap unit comprising a rigid inlet pipe, a rigid outlet pipe, said rigid inlet pipe terminating at a level slightly above the highest internal bottom level of said outlet pipe, a conduit connecting said inlet and outlet pipes, said connecting conduit having rigid bottom and side walls and a wall extending between said side walls continuously from said inlet pipe terminating level arcuately downwardly and then upwardly to a level above the outlet pipe highest interior bottom level to form a water trap, said last-named wall being elastically compressible throughout substantially its entire length and being formed by the surface of a composite block of elastically compressible material and an internal rigid reinforcement, said block being replaceably suspended through an aperture in the top of said unit between said inlet and outlet pipes with said rigid reinforcement being fastened rigidly to said rigid inlet and outlet pipes.

2. A unit as claimed in claim 1 wherein the last-named wall is elastically compressible from a point above the normal level of water at the inlet end of said trap to a point above the normal level of water at the outlet end of said trap.

3. A unit as claimed in claim 1 wherein the elastically compressible portion of said block is constituted of closed cell foam extending throughout the entire length of said last-named wall, thereby providing a trap which is expansible in volume in every cross-section taken below the normal level of water in said trap transversely of the direction of liquid flow therethrough.

4. A unit as claimed in claim 1 wherein the rigid bottom and side walls of said conduit are metallic and an electrical heater is located in heat exchange relation with said metallic side and bottom walls for thawing said trap.

5. A unit as claimed in claim 1 having in addition, a thermostat connected to said heater for activating said heater when said metallic walls reach a set minimum temperature above freezing.

References Cited

UNITED STATES PATENTS

| | | | |
|---|---|---|---|
| 953,199 | 3/1910 | Gamon | 138—27 |
| 1,381,426 | 6/1921 | Parker | 138—27 |
| 1,489,444 | 4/1924 | Kestler | 138—33 |
| 1,971,026 | 8/1934 | Beall | 138—27 |
| 2,484,031 | 10/1949 | Havrenius | 137—247.11 |
| 2,824,209 | 2/1958 | Leipold | 138—33 XR |
| 2,935,992 | 5/1960 | Barker et al. | 137—247.11 |
| 3,120,600 | 2/1964 | True | 138—22 XR |
| 3,137,167 | 6/1964 | Allen | 138—28 XR |

FOREIGN PATENTS

| | | |
|---|---|---|
| 1,046,124 | 7/1953 | France. |
| 22,744 | 2/1962 | Germany. |
| 526,461 | 9/1928 | Germany. |

LAVERNE D. GEIGER, *Primary Examiner.*

B. KILE, *Assistant Examiner.*

UNITED STATES PATENT OFFICE
CERTIFICATE OF CORRECTION

Patent No. 3,396,752                                            August 13, 1968

Russell Brown Strout et al.

It is certified that error appears in the above identified patent and that said Letters Patent are hereby corrected as shown below:

Column 4, line 30, claim reference numeral "1" should read -- 4 --.

Signed and sealed this 27th day of January 1970.

(SEAL)
Attest:

Edward M. Fletcher, Jr.                             WILLIAM E. SCHUYLER, JR.
Attesting Officer                                             Commissioner of Patents